(12) United States Patent
Kagan et al.

(10) Patent No.: US 8,407,478 B2
(45) Date of Patent: Mar. 26, 2013

(54) CONTROL MESSAGE SIGNATURE FOR DEVICE CONTROL

(75) Inventors: Michael Kagan, Zichron Yaakov (IL); Noam Bloch, Bat Shlomo (IL)

(73) Assignee: Mellanox Technologies Ltd., Yokneam (IL)

( * ) Notice: Subject to any disclaimer, the term of this patent is extended or adjusted under 35 U.S.C. 154(b) by 587 days.

(21) Appl. No.: 12/498,381

(22) Filed: Jul. 7, 2009

(65) Prior Publication Data

US 2011/0010557 A1    Jan. 13, 2011

(51) Int. Cl.
*H04L 9/32*    (2006.01)
*G01R 31/28*    (2006.01)

(52) U.S. Cl. ........ 713/180; 713/155; 713/168; 380/278; 380/282; 714/712

(58) Field of Classification Search .......... 713/175–181, 713/150–154, 155–159, 160–167, 189–193; 726/1–22; 380/28–30, 255–283; 709/229
See application file for complete search history.

(56) References Cited

U.S. PATENT DOCUMENTS

| | | | |
|---|---|---|---|
| 6,289,023 B1 | 9/2001 | Dowling et al. | |
| 7,334,124 B2 | 2/2008 | Pham et al. | |
| 7,412,475 B1 | 8/2008 | Govindarajalu | |
| 7,447,975 B2 | 11/2008 | Riley | |
| 7,636,767 B2 | 12/2009 | Lev-Ran et al. | |
| 7,904,713 B1 * | 3/2011 | Zajkowski et al. | 713/156 |
| 2004/0153907 A1 * | 8/2004 | Gibart | 714/712 |
| 2007/0124415 A1 | 5/2007 | Lev-Ran et al. | |

OTHER PUBLICATIONS

Working Draft Project American National Standard T10/1799-D, "Information Technology—SCSI Block Commands-3 (SBC-3)", Revision 19, May 29, 2009.
"Infiniband Architecture: Specification vol. 1", Release 1.2.1, Infiniband Trade Association, Nov. 2007.
"Mellanox ConnectX IB: Dual-Port InfiniBand Adapter Cards with PCI Express 2.0", Mellanox Technologies, USA, 2008.

* cited by examiner

*Primary Examiner* — Ashok Patel
*Assistant Examiner* — Evans Desrosiers
(74) *Attorney, Agent, or Firm* — D. Kligler IP Services Ltd.

(57) ABSTRACT

A method of controlling a peripheral device includes generating, in a host processor, a control message for transmission to the peripheral device, and calculating a signature for the control message. The control message and the signature are written to an address in a system memory of the host processor, and the peripheral device is notified of the address, so as to cause the device to read the control message and the signature from the system memory.

27 Claims, 3 Drawing Sheets

CONTROL MESSAGE SIGNATURE FOR DEVICE CONTROL

FIELD OF THE INVENTION

The present invention relates generally to the field of computer peripheral devices and more particularly relates to controlling a computer peripheral device.

BACKGROUND

Error checking codes are a common technique for detecting accidental changes to computer data, and are used in many modern digital networks and storage devices. Typically, an error checking code comprises a fixed-size data element computed from a block of digital data for the purpose of detecting accidental errors that may have been introduced during transmission or storage. The integrity of the block of digital data can be checked at any later time by recomputing the error checking code and comparing it with the stored one. If the codes do not match, then the block of digital data contains a data error.

Examples of error checking codes include, without limitation, checksums and cyclic redundancy checks (CRC). A checksum algorithm yields a different result with high probability if data has been accidentally corrupted. On the other hand, when checksums match, the data is very likely to be free of accidental errors.

SUMMARY OF THE INVENTION

There is thus provided, in accordance with an embodiment of the invention, a method of controlling a peripheral device, including generating, in a host processor, a control message for transmission to the peripheral device, calculating a signature for the control message, writing the control message and the signature to an address in a system memory of the host processor, and notifying the peripheral device of the address, so as to cause the device to read the control message and the signature.

There is also provided in accordance with an embodiment of the invention, a method of controlling a peripheral device, including receiving in the peripheral device a notification from a host processor of an address to which a control message for the peripheral device has been written together with a signature in a system memory of the host processor, reading into the peripheral device the control message and the signature from the address in the system memory, verifying the signature, and upon successfully verifying the signature, executing the control message in the peripheral device.

There is further provided in accordance with an embodiment of the invention, a method of controlling a peripheral device, including generating, in a host processor, a control message for transmission to the peripheral device, calculating a signature for the control message, writing the control message and the signature to an address in a system memory of the host processor, notifying the peripheral device of the address, so as to cause the device to read the control message and the signature, receiving in the peripheral device the notification from the host processor of the address to which the control message for the peripheral device has been written together with the signature in the system memory of the host processor, reading into the peripheral device a control message and the signature from the address in the system memory, verifying the signature, and upon successfully verifying the signature, executing the control message in the peripheral device.

There is additionally provided in accordance with an embodiment of the invention, a computer program product for controlling a peripheral device, the computer program product including a computer usable medium having computer usable code embodied therewith, the computer usable program code including computer usable code configured for generating, in a host processor, a control message for transmission to the peripheral device, computer usable code configured for calculating a signature for the control message, computer usable code configured for writing the control message and the signature to an address in a system memory of the host processor, and computer usable code configured for notifying the peripheral device of the address, so as to cause the device to read the control message and the signature.

There is moreover provided in accordance with an embodiment of the invention, a computer peripheral device, including a host interface, which is coupled to communicate with a host processor and a system memory of the host processor and a processing circuit which is configured to receive a notification from the host processor of an address to which a control message for the peripheral device has been written together with a signature in the system memory, to read the control message and the signature from the address in the system memory, to verify the signature, and upon successfully verifying the signature, to execute the control message.

BRIEF DESCRIPTION OF THE DRAWINGS

The invention is herein described, by way of example only, with reference to the accompanying drawings, wherein.

DETAILED DESCRIPTION OF EMBODIMENTS

Notation Used Throughout

Figure 1:
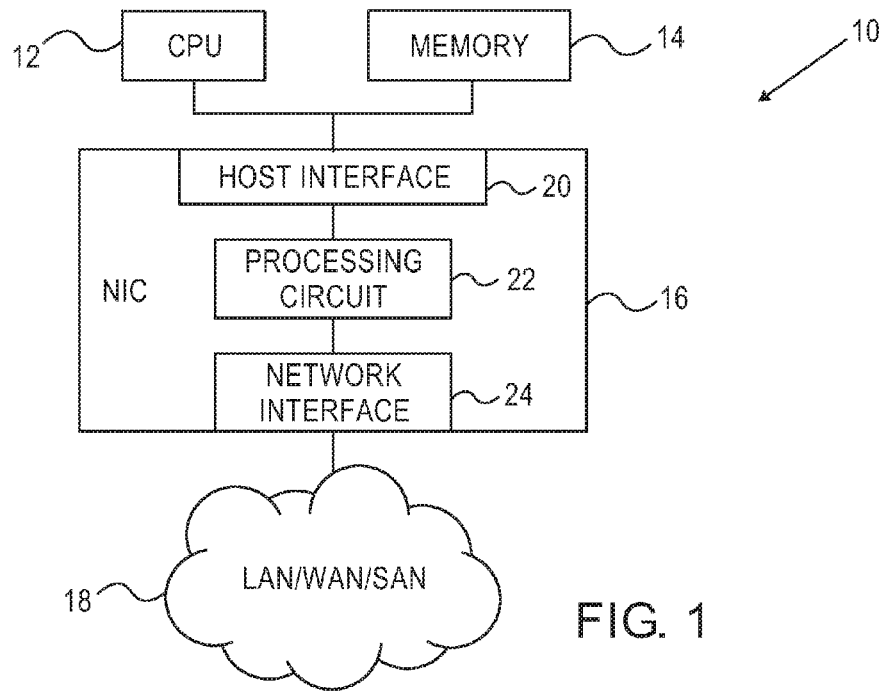
FIG. 1 is a diagram schematically illustrating an example computer processing system implementing a technique for device control message integrity, in accordance with an embodiment of the present invention.

The following notation is used throughout this document:

| Term | Definition |
| --- | --- |
| ASCII | American Standard Code for Information Interchange |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HCA | Host Channel Adapter |
| HTTP | Hyper-Text Transport Protocol |
| I/O | Input/Output |
| LAN | Local Area Network |

-continued

| Term | Definition |
|---|---|
| NIC | Network Interface Card |
| RAM | Random Access Memory |
| RF | Radio Frequency |
| ROM | Read Only Memory |
| SAN | Storage Area Network |
| URL | Uniform Resource Locator |
| WAN | Wide Area Network |

Overview

Conventionally, a host processor controls a device (typically, but not limited to a computer peripheral device) by writing a control message the device. The control message typically has the form of a numerical value that is loaded directly by the host processor into a register on the device. Upon detecting a numerical value written to one of its registers, the device changes its status and executes the control message corresponding to the numerical value written to the register. A potential danger with allowing a control message to be written to a device register in this manner is that an unintended or incorrect write to a device register can result in a change in the device status. These problems can arise from a bug in a computer program, which causes the host processor to perform an incorrect (with respect to the program specifications) write to a device register. In these instances, the device may attempt to execute an unintended (and potentially invalid or harmful) control message, which may affect overall system stability and reliability, potentially leading to either a system level error or silent data corruption.

In embodiments of the present invention, a host processor controls a device by writing the control message to a certain address in system memory (referred to as a "mailbox") and then notifying the device of the address by loading the address into a mailbox address register in the device. Once the device detects the address in the mailbox address register, the device executes the control message by reading the memory address, retrieving the control message and then executing the necessary operation(s). In embodiments of the present invention, the host processor is only allowed to write to the mailbox address register. Communication with other registers in the device is effected by writing a control message to a mailbox in system memory and loading the mailbox address to the mailbox address register.

Potential problems with writing a control message to a mailbox include (1) an incorrect address loaded into the device mailbox register and (2) an invalid command message stored in system memory. An embodiment of the present invention addresses these potential problems by having the host processor append a signature comprising an error checking code to the control message that the host processor writes to the mailbox in system memory. Upon receiving notification of the address from the host processor, the device retrieves the control message and the signature from the mailbox. The device verifies the signature and then executes the control message only if the signature is valid. This ensures that only intended and valid control messages are acted upon by the device.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, a tangible storage medium, such an electronic, magnetic or optical memory device. Alternatively, the medium may comprise an electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

FIG. 1 is a schematic pictorial illustration of an example computer system 10, in accordance with an embodiment of the present invention. System 10 comprises a central processing unit (CPU) 12, which is programmed in software to carry out the functions that are described hereinbelow. The system also comprises a system memory 14, which may comprise both static read only memory and a dynamic main memory, in communication with the processor.

The computer system is connected to one or more external networks 18, such as a LAN or WAN, by communication lines connected to the system via a data I/O device 16, identified here as a network interface device (or network interface card—NIC). Data I/O device 16 enables system 10 to become coupled to other data processing systems or remote printers or storage devices through intervening private or public networks. For instance, device 16 may comprise an InfiniBand™ host channel adapter (HCA). Alternatively, the principles of the present invention may be applied to other types of computer peripheral devices, and I/O device 16 is shown and described here only by way of example.

Data I/O device 16 comprises a host interface 20, which communicates with processor 12 and memory 14, a network interface 24, which communicates with network 18, and a processing circuit 22. Processing circuit 22 implements device control message integrity logic in accordance with an embodiment of the present invention, in addition to other I/O processing functions as are known in the art. For example, assuming device comprises a HCA, these I/O processing functions typically include generating, transmitting and receiving packets over network 18 in accordance with work requests submitted by processor 12, as well as transferring packet payload data to and from memory 14.

Although FIG. 1 shows a particular computer system configuration, other digital computer system configurations can also be employed to implement embodiments of the present invention, and are thus considered to be within the spirit and scope of this invention.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Device Control Message Integrity

Figure 2:
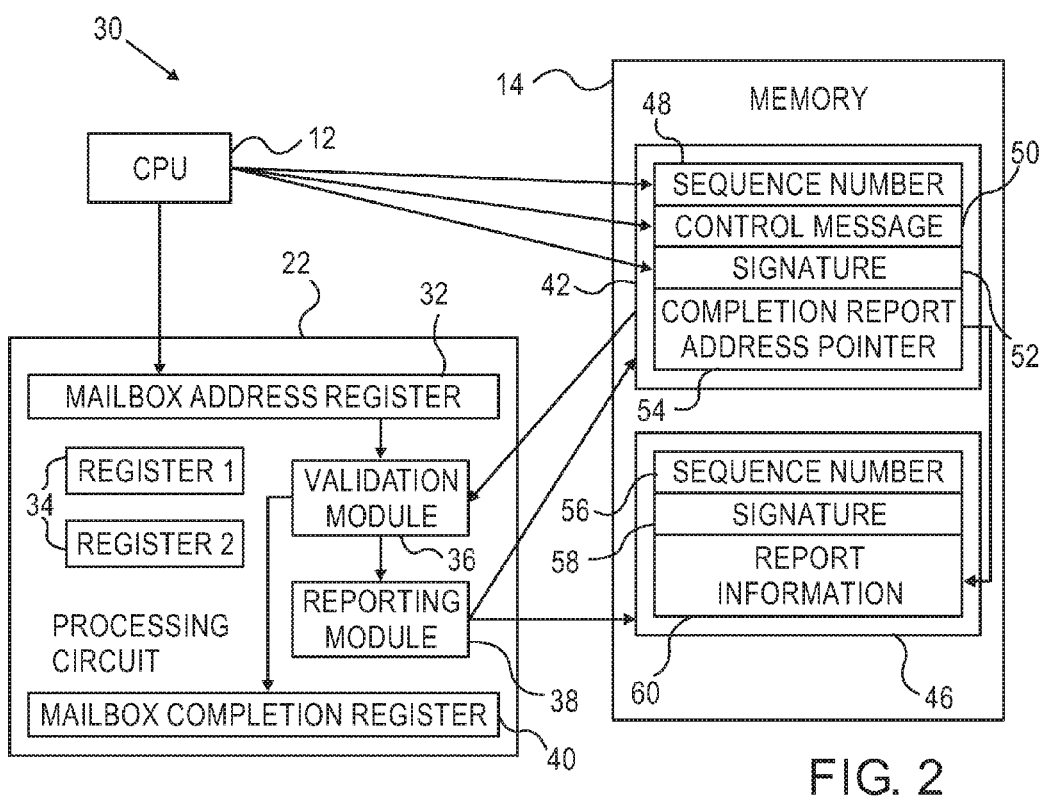
FIG. 2 is a diagram that schematically shows details of an example network interface adapter processing a device control message in accordance with an embodiment of the present invention.

FIG. 2 is block diagram 30 that schematically illustrates functional components of system 10 that are used in ensuring device control message integrity, in accordance with an embodiment of the present invention. Specifically, this figure shows details of processing circuit 22 in device 16, along with data structures in memory 14 that are written and read by CPU 12 and processing circuit 22 in the course of creating and executing control messages. These circuits and data structures are described in greater detail with referenced to the figures that follow.

Figure 3:
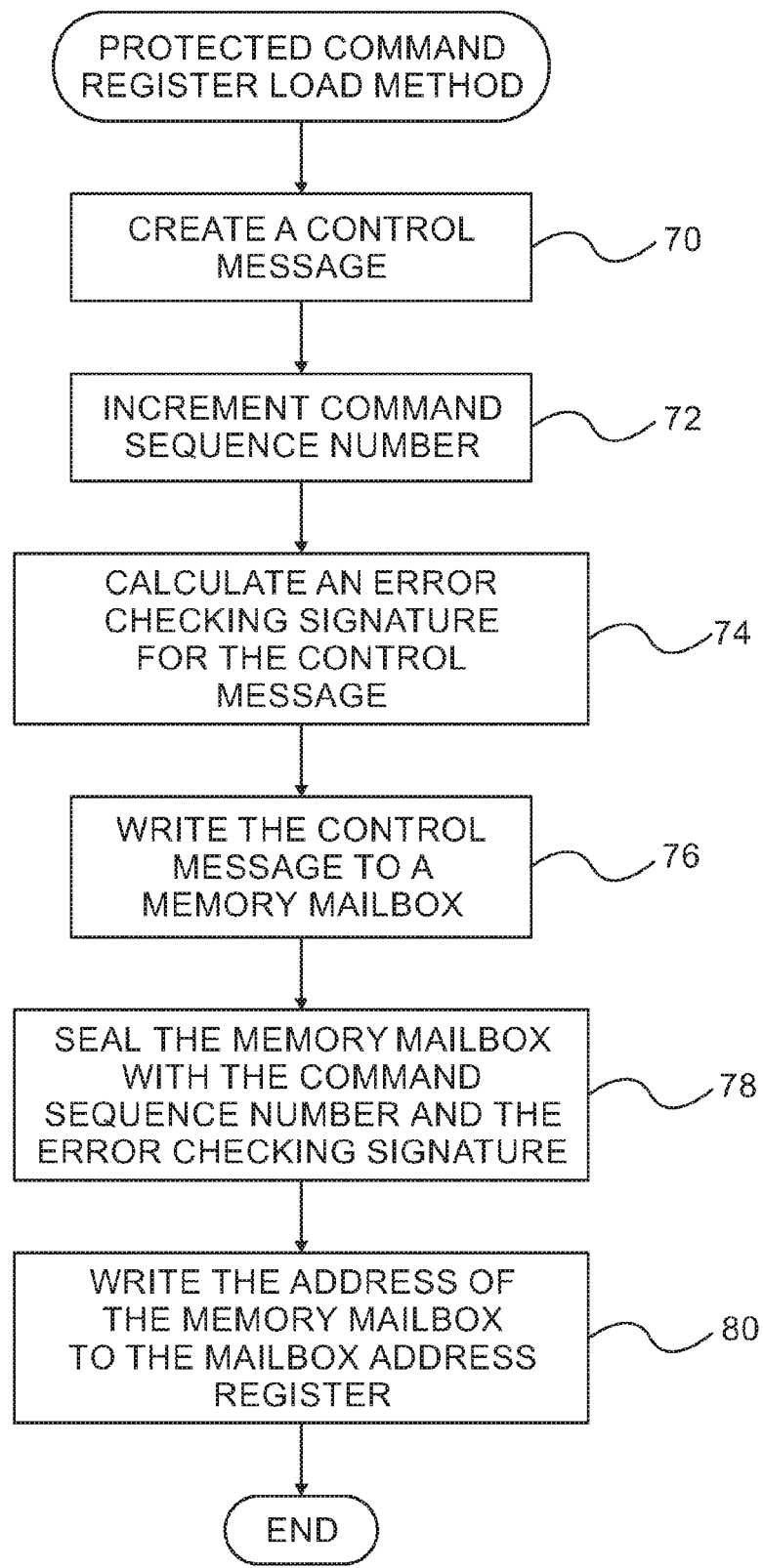
FIG. 3 is a flow diagram illustrating a protected command register load method, in accordance with an embodiment of the present invention.

FIG. 3 is a flow chart that schematically illustrates a method for loading a protected command into a register in a peripheral device, in accordance with an embodiment of the present invention. The command comprises a sequence number 48, a control message 50 and a signature 52. To keep track of control messages sent to device 16, CPU 12 numbers each control message with sequence number 48. Upon device startup, sequence number 48 is typically initialized to zero. CPU 12 increments sequence number 48 for each control messages sent to device 16, thereby providing a unique sequence number for each control message.

To pass a control message to device 16, CPU 12 first computes control message 50 in the form of one or more words of data (in accordance with the interface specification of device 16) (step 70). CPU 12 then increments sequence number 48 (step 72) and calculates a signature 52 for control message 50 (step 74). Signature 52 comprises an error checking code, which is computed over the bits of the control message. Any suitable type of error checking code may be used, such as an eight bit XOR checksum or a cyclic redundancy check, for example.

CPU 12 then loads control message 50 into a selected location, referred to as a memory mailbox 42, in system memory (step 76). CPU 12 "seals" memory mailbox 42 by writing sequence number 48 and signature 52 to memory mailbox 42 (step 78). The CPU may also write a completion report address pointer to the mailbox, for use by device 16 in returning a completion report 46, as described below. Finally, CPU 12 loads the address in system memory of memory mailbox 42 into a mailbox address register 32 in device 16 (step 80). Loading an address into mailbox address register 32 generates an interrupt or other event indication to processing circuit 22, indicating that a control message is waiting to be acted upon in memory 14.

Figure 4:
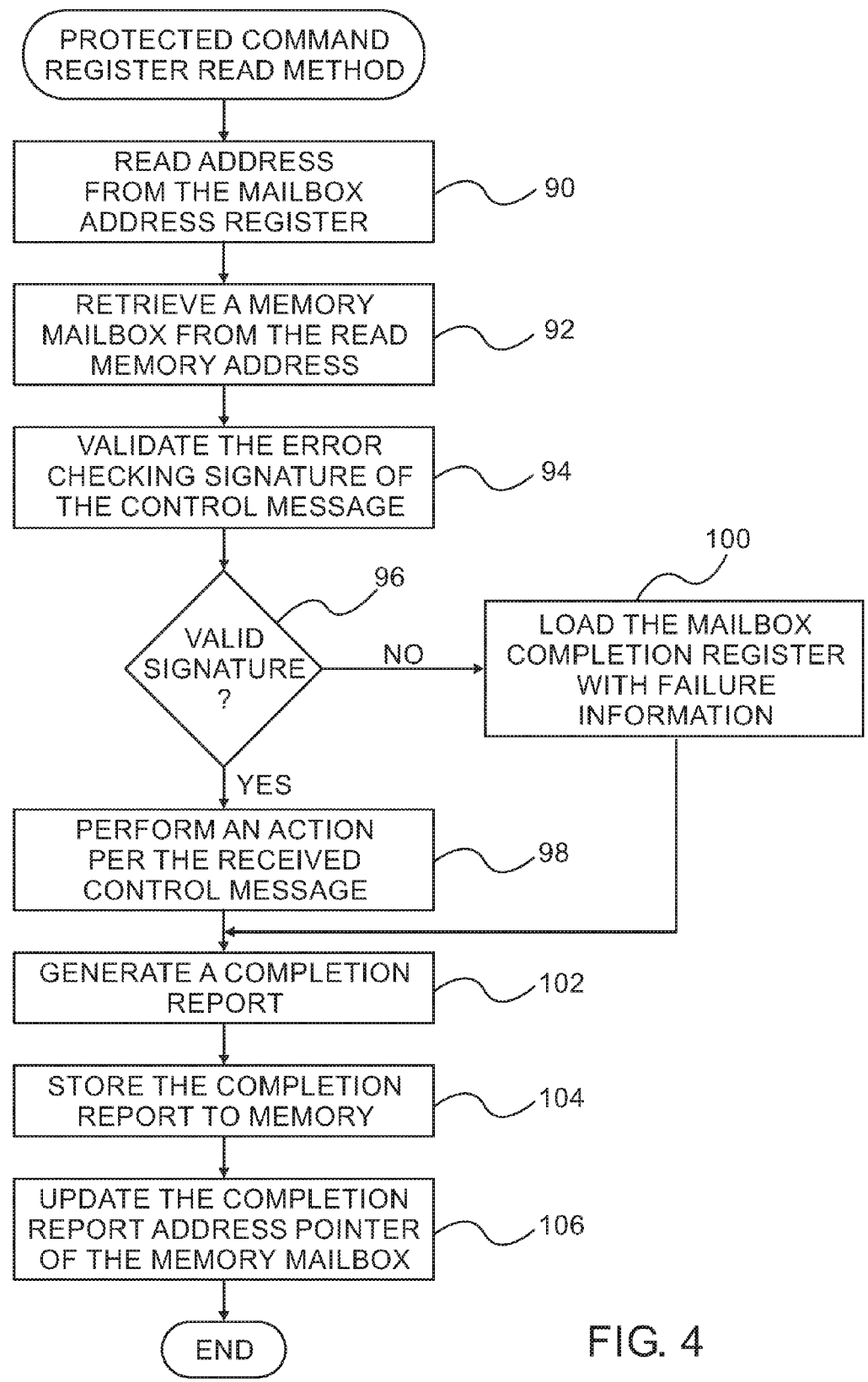
FIG. 4 is a flow diagram illustrating a protected command register read method, in accordance with an embodiment of the present invention.

FIG. 4 is a flow chart that schematically illustrates a method by which processing circuit 22 executes a protected command, in accordance with an embodiment of the present invention. When processing circuit 22 detects that an address has been loaded into mailbox address register 32, a validation module 36 reads the address of memory mailbox 42 from mailbox address register 32 (step 90), and retrieves the data in memory mailbox 42 from system memory 14 (step 92). Memory mailbox 42 contains sequence number 48, control message 50 and signature 52, as noted above. Validation module 36 then validates signature 52 of memory mailbox 42 by calculating a signature (i.e. error checking code) for control message 50, and comparing the calculated signature to signature 52 (step 94).

If signature 52 correctly corresponds to the signature calculated for control message 50 (step 96), validation module 36 causes processing circuit 22 to execute the control message. Execution is typically accomplished by loading control message 50 into an appropriate register 34 in device 16, thereby causing processing circuit 22 to carry out the desired action (step 98). If, on the other hand, signature 52 does not correspond to the signature calculated for control message 50, then validation module 36 loads sequence number 48 and a mailbox signature failure indicator into a mailbox completion register 40 (step 100). This enables error handling software executing on CPU 12 to retrieve the contents of mailbox completion register 40 and take appropriate action (i.e. with regard to the failed validation).

After processing circuit 42 completes processing control message 50, a reporting module 38 then generates completion report 46 (step 102) and stores completion report 46 in system memory 14 (step 104). Reporting module 38 then updates completion report address pointer 54 of memory mailbox 42 in with the address in system memory 12 to which completion report 46 was written (step 106).

Completion report 46 includes a sequence number 56 (corresponding to sequence number 48) and a report information message 60, which comprises any pertinent information regarding the execution of control message 50. For example, message 60 may indicate that the control message was read and executed successfully, or it may alternatively report that the control message was aborted due to a signature error discovered at step 96. Reporting module 38 then seals completion report 46 with a signature 58. The reporting module may trigger an interrupt or other event indication to CPU 12 to indicate that the completion report is ready. Alternatively or additionally, reporting module 38 writes sequence number 56 last among the elements of report 46, thereby enabling software executing on CPU 12 to poll the memory location of sequence number 56 while waiting for processing circuit 22 to complete executing control message 50.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A method of controlling a peripheral device, comprising:
generating, in a host processor, a control message for transmission to the peripheral device;
calculating a signature for the control message;
writing the control message and the signature to an address in a system memory of the host processor; and
notifying the peripheral device of the address in the system memory, so as to cause the peripheral device to read the control message and the signature, whereby the peripheral device verifies the signature, and upon successfully verifying the signature, executes the control message.

2. The method according to claim 1, wherein notifying the peripheral device comprises writing the address to a register in the peripheral device.

3. The method according to claim 1, wherein the signature comprises an error checking code.

4. The method according to claim 1, and comprising writing a command sequence number to the system memory together with the signature.

5. The method according to claim 1, wherein the peripheral device comprises a network interface device, which is coupled to convey data to and from the system memory via a network in accordance with the control message.

6. A method of controlling a peripheral device, comprising:
receiving in the peripheral device a notification from a host processor of an address to which a control message for the peripheral device has been written together with a signature in a system memory of the host processor;
reading into the peripheral device the control message and the signature from the address in the system memory;
verifying the signature; and
upon successfully verifying the signature, executing the control message in the peripheral device.

7. The method according to claim 6, wherein executing the control message comprises loading the control message from the address in the system memory into a register in the peripheral device.

8. The method according to claim 6, wherein receiving the notification comprises reading the address from a register in the peripheral device to which the host processor has written the address.

9. The method according to claim 6, and comprising reading a command sequence number from the system memory together with the signature.

10. The method according to claim 9, and comprising writing a completion report from the peripheral device to the system memory using the command sequence number, wherein the completion report contains a failure indication when the signature is not verified successfully.

11. The method according to claim 6, wherein the peripheral device comprises a network interface device, which is coupled to convey data to and from the system memory via a network in accordance with the control message.

12. The method according to claim 6, wherein the signature comprises an error checking code.

13. The method according to claim 12, wherein verifying the signature comprises:
calculating, in the peripheral device, a further error checking code over the control message; and
comparing the error checking code to the further error checking code.

14. A method of controlling a peripheral device, comprising:
generating, in a host processor, a control message for transmission to the peripheral device;
calculating a signature for the control message;
writing the control message and the signature to an address in a system memory of the host processor;
notifying the peripheral device of the address, so as to cause the peripheral device to read the control message and the signature;
receiving in the peripheral device the notification from the host processor of the address to which the control message for the peripheral device has been written together with the signature in the system memory of the host processor;
reading into the peripheral device a control message and the signature from the address in the system memory;
verifying the signature; and
upon successfully verifying the signature, executing the control message in the peripheral device.

15. A computer program product for controlling a peripheral device, the computer program product comprising:
a non-transitory computer usable medium having computer usable code embodied therewith, the computer usable program code comprising:
computer usable code configured for generating, in a host processor, a control message for transmission to the peripheral device;
computer usable code configured for calculating a signature for the control message;
computer usable code configured for writing the control message and the signature to an address in a system memory of the host processor; and
computer usable code configured for notifying the peripheral device of the address, so as to cause the peripheral device to read the control message and the signature, whereby the peripheral device verifies the signature, and upon successfully verifying the signature, executes the control message.

16. The computer program product according to claim 15, wherein notifying the peripheral device comprises writing the address to a register in the peripheral device.

17. The computer program product according to claim 15, wherein the signature comprises an error checking code.

18. The computer program product according to claim 15, and comprising computer usable code configured for writing a command sequence number to the system memory together with the signature.

19. The computer program product according to claim 15, wherein the peripheral device comprises a network interface device, which is coupled to convey data to and from the system memory via a network in accordance with the control message.

20. A computer peripheral device, comprising:
a host interface, which is coupled to communicate with a host processor and a system memory of the host processor; and
a processing circuit which is configured to receive a notification from the host processor of an address to which a control message for the peripheral device has been written together with a signature in the system memory, to read the control message and the signature from the address in the system memory, to verify the signature, and upon successfully verifying the signature, to execute the control message.

21. The computer peripheral device according to claim 20, and comprising a plurality of registers, including a mailbox address register, which is configured to receive the address from the host processor.

22. The computer peripheral device according to claim 21, wherein the processing circuit is configured, upon successfully verifying the signature, to load the control message from the address in the system memory into at least one of the registers in the device.

23. The computer peripheral device according to claim 20, wherein the processing circuit is configured to read a command sequence number from the system memory together with the signature.

24. The computer peripheral device according to claim 23, and comprising writing a completion report from the peripheral device to the system memory using the command sequence number, wherein the completion report contains a failure indication when the signature is not verified successfully.

25. The computer peripheral device according to claim 20, wherein the signature comprises an error checking code.

26. The computer peripheral device according to claim 25, wherein the processing circuit is configured to verify the signature by calculating a further error checking code over the control message, and comparing the error checking code to the further error checking code.

27. The computer peripheral device according to claim 20, and comprising a network interface, which is coupled to convey data to and from a network in accordance with the control message.

\* \* \* \* \*